United States Patent [19]

Hwag

[11] 3,741,103
[45] June 26, 1973

[54] SIMPLE AND CONVENIENT ROASTER

[76] Inventor: Cheng-Hsuon Hwag, No. 469, Chung Hwa Road, Hsincha, Taiwan, China

[22] Filed: Dec. 15, 1971

[21] Appl. No.: 208,079

[52] U.S. Cl. ...... 99/421 A, 99/421 HH, 99/421 HV
[51] Int. Cl. ............................................ A47j 37/04
[58] Field of Search................... 99/421, 420, 419, 99/443, 339, 340

[56] References Cited
UNITED STATES PATENTS

| | | | |
|---|---|---|---|
| 3,017,819 | 1/1962 | Manteris | 99/421 HH |
| 3,297,166 | 1/1967 | Summers | 99/421 HH X |
| 3,309,982 | 3/1967 | Surks | 99/420 |
| 3,316,010 | 4/1967 | Lowrance | 99/419 X |
| 3,381,606 | 5/1968 | Kodey | 99/421 HV |
| 3,393,630 | 7/1968 | Pickens | 99/421 HH X |

Primary Examiner—John Petrakes
Assistant Examiner—Arthur O. Henderson
Attorney—John J. McGlew et al.

[57] ABSTRACT

A device for cooking or roasting comprises an open topped fire box which is supported at its bottom on legs which are engaged into fastening plates at each end thereof. The opened top of the fire box is provided with a formation on at least one side defining a mounting base for a comb-shaped skewer holder. A skewer is held between fingers of the comb and it includes an end overlying and facing the fire box top with a plurality of openings for receiving skewer rods.

7 Claims, 7 Drawing Figures

PATENTED JUN 26 1973

INVENTOR
CHENG-HSUON HWAG

BY John G. McGlew
ATTORNEY

PATENTED JUN 26 1973 3,741,103

INVENTOR
CHENG-HSUON HWANG

BY John J. McGlew
ATTORNEY

SIMPLE AND CONVENIENT ROASTER

BACKGROUND OF THE INVENTION

1. Field of the Invention

This invention relates in general to the construction of roasters, and in particular, to a new and useful outdoor or barbecue type roaster including a fire box which is supported on legs in which includes a mounting for a supporting comb for holding a skewer holding base which holds one or more individual skewers over the opened top of the fire box.

2. Description of the Prior Art

The present invention relates to a roaster. Conventional roasters on the market have the following disadvantages. (1) Because the iron plate is placed on the surface of a roaster and meat is roasted on this iron plate, roasting is not uniform and it takes much time for roasting due to the low thermal efficiency. (2) Because the legs of a roaster are made of iron or wood and can not be demounted, they are breakable and inconvenient for carrying.

SUMMARY OF THE INVENTION

In the present invention the disadvantages of a conventional roaster mentioned above have been overcome, and the roaster according to the present invention can be used for roasting a large quantity of meat uniformly at a time and in a short time with skewers placed directly on the fire instead of using the iron plate. The distance between the meat on skewers and the fire can be adjusted according to the condition of roasting. The legs can be demounted easily and kept inside the fireplace when not in use, so that the equipment is handy for carrying.

BRIEF DESCRIPTION OF THE DRAWINGS

Referring to the accompanying drawings of the roaster in the present invention.

GENERAL DESCRIPTION OF THE DRAWINGS

Figure 1:
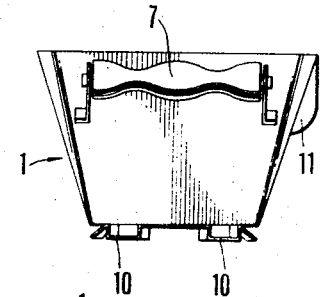
FIG. 1 is a lateral view of the fireplace,
FIG. 2 a base view of the fireplace,
FIG. 3 the fixing member of legs,
FIG. 4 the legs,
FIG. 5 the holding base of skewers,
FIG. 6 the skewers, and
FIG. 7 the assembly of the roaster.
Figure 2:
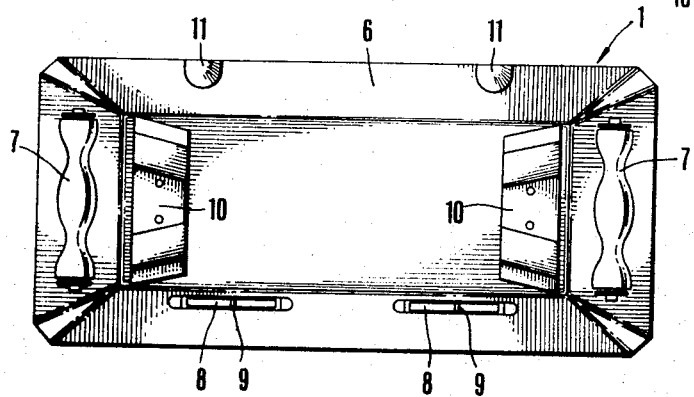
Figure 3:
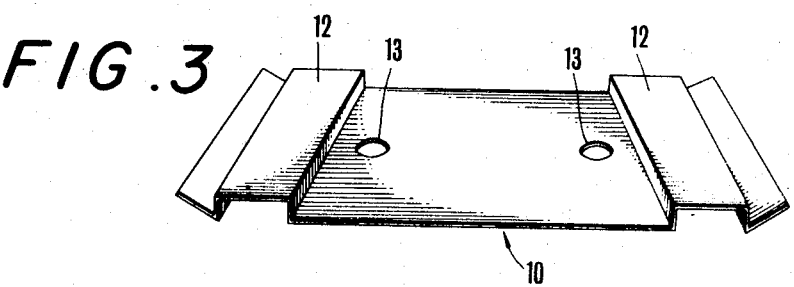

The construction of the roaster in the present invention is largely composed of the fireplace 1, the legs 2, the leg securing plate 10, the comb-like stand 3, the skewer holding base 4, and the skewers 5. As shown in FIG. 1 and FIG. 2, the fireplace 1 is provided with the hand grips 7 on both sides of the main body 6, and the vent 8 and the door 9 to control the combustion air near the bottom. Both sides of the bottom of the plate 10 are fastened to the main body 6 with a rivet. As shown in FIG. 3, the plate 10 used to place the main body 6 immovably on the legs 2, is provided with the projection 12 made of elastic metal plate and processed by pressing, and the legs 2 are fixed inside the projection 12. The number 13 shows the rivet hole.

Figure 4:
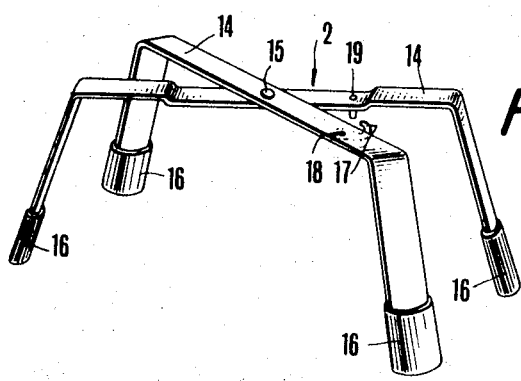
Figure 5:
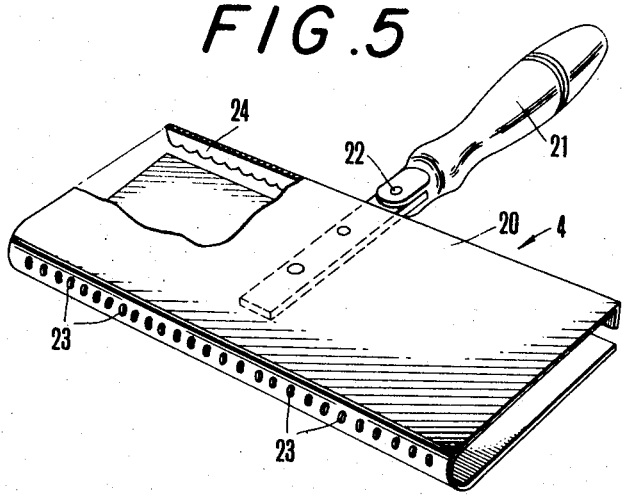
Figure 6:

As shown in FIG. 4, the legs 2, made of two pieces of metal plate 14 with both ends bent, are riveted in the form of X at the fulcrum 15. These two pieces of metal plate 14, the tips of which are provided with a rubber caps, can be opened and closed with the fulcrum 15 in the center. The opening angle of the two pieces of metal plate 14 is kept constant by engaging the hook 17 which is fixed to one piece of the metal 14 with a hook holder 19 pivoted on a rivet 18 of the other piece of metal plate 14. When the roaster is not used, the legs 2 can be closed and kept easily inside the fireplace 1.

The holding base of skewers 4 is composed of the rectangular U-shaped base 20 made of metal plate and the handle 21 made of wood and riveted at the fulcrum 22. The handle 21 can be turned 90 degrees to the left and right at the fulcrum 22 in the center when it is kept inside the fire place 1. The U-shaped base 20 includes tip and bottom flat leg portions with a connecting base or front surface provided with a plurality of openings 23 through which skewers 5 are inserted. The rear surface of the base 20 is provided with the wavelike holding teeth for skewers 24. The tips of the skewers 24 are inserted through the openings and can be held immovably therein.

Figure 7:
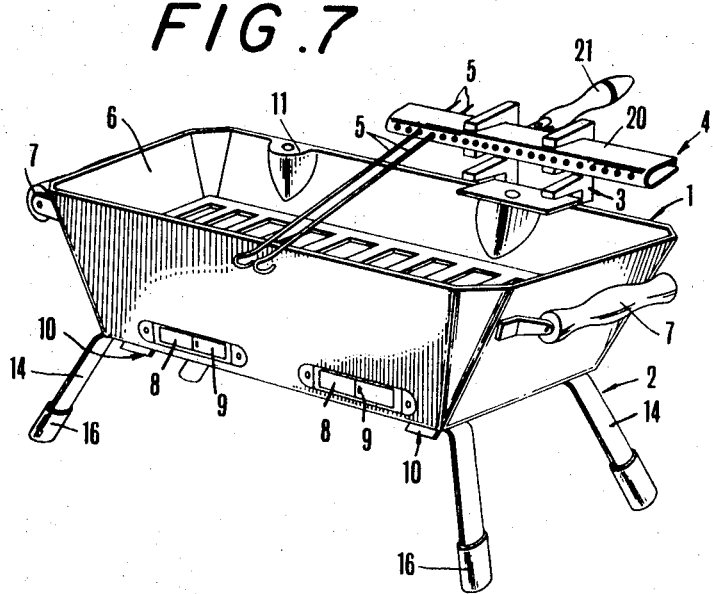

In the assembly drawing of FIG. 7 showing the roaster in use according to the present invention, the fireplace 1 is placed on the legs 2, the comb-like stand 3 being fixed by inserting through the stationary open 11. The skewer holding base 4 is engaged with the teeth of the comb-like stand 3 selected according to the condition of roasting, and meat and skewers 5 are fixed by inserting them through the openings 23 of the skewer holding base and positioning them between the holding teeth of skewers 24.

In this way, the roaster according to the present invention can be used for roasting a large quantity of meat uniformly at a time with the comb-like stand 3 and the holding base of skewers instead of conventional iron plate placed on the fireplace, and the distance between the skewers and the fire can be adjusted according to the roasting condition needed. Moreover, the construction of the roaster in its entirety is simple, and the legs 2, the comb-like stand 3, the holding base of skewers 4, and the skewers can be demounted to be kept inside the fireplace when the roaster is not used, making the equipment hand for maintenance and carrying.

What is claimed is:

1. A device for cooking or roasting comprising an open-top fire box, leg means for supporting said fire box secured to the bottom thereof, a mounting comb for skewers secured to said fire box adjacent the top thereof and having a plurality of generally horizontal vertically spaced support fingers overlying the top of said fire box, and a skewer holding base engaged between adjacent fingers of said comb and having an end facing toward the opened top of said fire box with a plurality of openings therein for receiving individual skewers.

2. A device, according to claim 1, including an elongated skewer rod of a length equal to the width of said fire box engaged in an opening of said skewer holding base.

3. A device, according to claim 1, wherein said leg means includes a plate member secured to each end of the bottom of said fire box and having a diagonally extending receiving recess at each side, and a set of diagonal leg members each being of generally U-shaped configuration with base portions forming a top thereof which are arranged in intersecting fashion and pivoted together, the bases extending through corresponding diagonal recesses of said plate and extending outwardly at each corner of said fire box.

4. A device, according to claim 1, wherein said fire box includes a side wall having a widened formation adjacent the top thereof with an opening therein, said comb support including a flat plate overlying said widened formation and having an opening therein through which a securing bolt is positioned to hold said plate with said comb in position.

5. A device, according to claim 4, including a vertically arranged mounting comb at each end of said plate with the fingers of adjacent mounting combs being aligned horizontally so as to hold said gear or holding base in a horizontal position.

6. A device, according to claim 5, wherein said skewer holding base comprises a U-shaped plate having a base with a plurality of openings defined therealong of a size for receiving individual skewer rods and a handle connected to said U-shaped plate at the opposite end thereof from said base.

7. A skewer base, comprising a U-shaped plate having top and bottom leg portions and a connecting base with a plurality of openings defined therealong for receiving skewer rods therein and a handle connected to at least one of said legs and extending outwardly in the opposite side of said plate from said base, said handle having a straight portion connected to said skewer base plate and a pivotal handle portion extending outwardly from said straight portion.

* * * * *